(12) United States Patent
Dautartas

(10) Patent No.: US 6,363,203 B1
(45) Date of Patent: Mar. 26, 2002

(54) VARIABLE FIBER OPTIC ATTENUATOR

(75) Inventor: Mindaugas Fernand Dautartas, Alburtis, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/397,487

(22) Filed: Sep. 16, 1999

(51) Int. Cl.[7] ................................................ G02B 6/00
(52) U.S. Cl. ..................................................... 385/140
(58) Field of Search ...................... 385/140, 13, 15–16, 385/25, 55

(56) References Cited

U.S. PATENT DOCUMENTS

| | | | |
|---|---|---|---|
| 4,519,671 A | 5/1985 | Curtis et al. | 385/140 |
| 4,529,262 A | 7/1985 | Ashkin et al. | 385/140 |
| 4,645,294 A * | 2/1987 | Oguey et al. | 385/140 |
| 4,946,236 A | 8/1990 | Dautartas et al | 385/17 |
| 5,042,886 A | 8/1991 | Benzoni | 385/16 |
| 5,066,094 A | 11/1991 | Takahashi | 385/73 |
| 5,087,122 A | 2/1992 | Ostrander et al. | 356/73.1 |
| 5,127,084 A * | 6/1992 | Takahashi | 385/140 |
| 5,319,733 A | 6/1994 | Emmons et al. | 385/140 |
| 5,727,099 A * | 3/1998 | Harman | 385/52 |
| 5,915,063 A | 6/1999 | Colbourne et al. | 385/140 |
| 6,085,016 A * | 7/2000 | Espindola et al. | 385/140 |
| 6,192,171 B1 * | 2/2001 | Goodman et al. | 385/16 |

* cited by examiner

Primary Examiner—Jordan M. Schwartz
(74) Attorney, Agent, or Firm—Wendy W. Koba

(57) ABSTRACT

A variable fiber optic attenuator is formed of a first, movable section of optical fiber and a second, fixed section of optical fiber. The fibers are disposed end-to-end on a substrate, where the substrate includes a cavity formed underneath an end portion of the movable fiber. As supported, the fiber endfaces are aligned such that complete optical coupling is achieved between the fibers. Upon application of an external force to the first, movable fiber, the end portion of the fiber is forced downward into the cavity (such as, for example, by application of an external magnetic field and the inclusion of a permalloy sleeve around the end portion). As the fiber moves downward into the cavity, the endface will become misaligned with the endface of the fixed fiber, leading to attenuation of the signal passing through the fixed fiber. By controlling the force applied to the movable fiber, the degree of attenuation can be well-controlled.

4 Claims, 3 Drawing Sheets

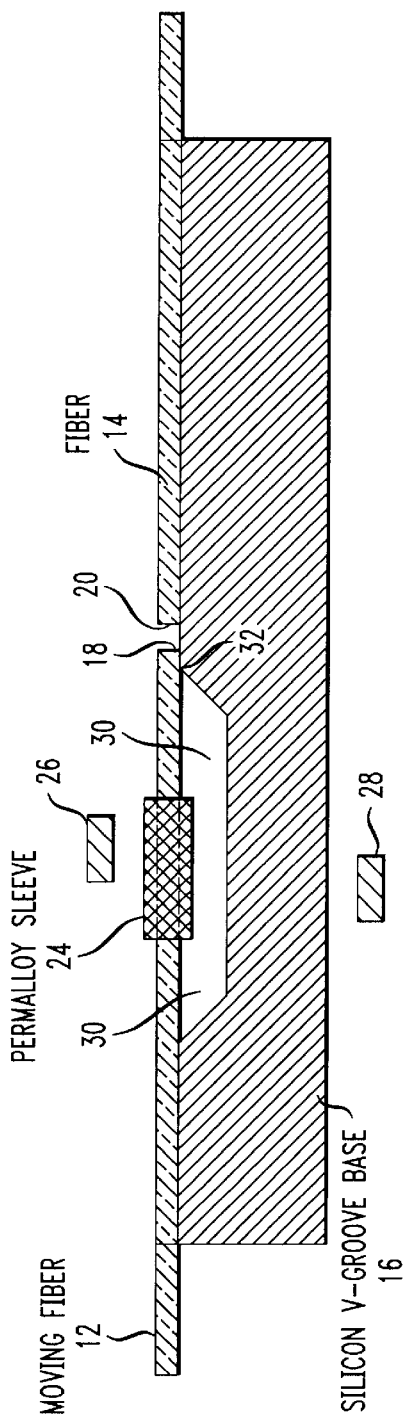

40

VARIABLE FIBER OPTIC ATTENUATOR

TECHNICAL FIELD

The present invention relates to a variable fiber optic attenuator and, more particularly, to the use of a silicon optical bench arrangement that can be well-controlled to provide the desired degree of attenuation.

BACKGROUND OF THE INVENTION

In many optical communication systems, as well as in testing environments, the need arises to be able to adjust the power level of an optical signal. In optical fiber amplifiers, for example, the power level of the optical pump signal needs to be well-controlled to avoid saturating the amplifier. Other systems may require the ability to monitor the power level to avoid power saturation or preserve a required bit error rate (BER). One function of attenuators is to reduce the intensity of optical signals entering a photosensitive device to preclude device damage and/or overloading. In other applications, attenuators may serve as noise discriminators by reducing the intensity of spurious signals received by an optical device to a level below the device response threshold. In still other applications (primarily in testing situations), attenuators are used to simulate the operation of optical systems without the need for long lengths of optical fibers.

There exists in the prior art many diverse arrangements for providing optical attenuation. One such arrangement provides the capability to switch between a pair of discrete power levels. Such an arrangement, while useful in certain circumstances is, of its nature, limited in application. Other approaches to providing variable optical attenuation require a variety of external components such as lenses, filters, prisms, etc., which thus increase the overall size and complexity (as well as cost) of the attenuator.

Thus, a need remains in the art for a fiber optic attenuator that is relatively simple to implement, yet is capable of providing a variable attenuation of the output signal level.

SUMMARY OF THE INVENTION

The need remaining in the prior art is addressed by the present invention, which relates to a variable fiber optic attenuator and, more particularly, to the use of a silicon optical bench arrangement that can be well-controlled to provide the desired degree of attenuation.

In accordance with the present invention, a variable fiber optic attenuator is provided utilizing a first, movable fiber and a second, fixed fiber. Both fibers are held in a common fixture that is capable of providing axial alignment between the fibers. The movable fiber includes an arrangement for applying a force to physically move the fiber endface, such as a magnetic (for example, permalloy) sleeve disposed around the fiber with an external electromagnetic magnetically coupled to the sleeve. Without the application of an external force (e.g., magnetic field), the fiber endfaces are in alignment, providing essentially 100% power coupling between the movable fiber and the stationary fiber. Upon the application of an external force, the endface of the movable fiber is displaced with respect to the endface of the stationary fiber so as to reduce the coupling therebetween. In accordance with the present invention, variable attenuation can be achieved by adjusting the strength of the applied force (i.e., magnetic field).

In a preferred embodiment of the present invention, both the movable fiber and the stationary fiber are supported by a silicon substrate including a V-groove for holding the fibers. An additional cavity is formed underneath the movable fiber in the vicinity of the permalloy sleeve to allow for the movement of the fiber. Upon the application of an external magnetic field, the section of movable fiber surrounded by the permalloy sleeve will move downward into the cavity. This downward movement will cause the endface of the movable fiber to move upward and out of alignment with the fixed fiber endface, thus decreasing the optical power coupling between the movable fiber and the endface of the fixed fiber.

In an alternative embodiment, a lid member may be disposed above the fiber-holding substrate. In this embodiment, the application of an external magnetic field causes the endface of the movable fiber to draw backwards, along the optical axis, away from the fixed fiber endface. The resulting separation between the endfaces, therefore, is sufficient to provide the desired optical attenuation.

Other and further embodiments of the present invention will become apparent during the course of the following discussion and by reference to the accompanying drawings.

BRIEF DESCRIPTION OF THE DRAWINGS

Referring now to the drawings, where like numerals represent like parts in several views:

FIG. 1 contains a cut-away side view of an exemplary embodiment of the present invention, the FIG. 1 embodiment illustrating the arrangement when the magnetic field is turned "off";

FIG. 2 contains a top view of the arrangement of FIG. 1, illustrating in particular the V-grooves supporting both fibers, as well as the cavity for accommodating the movable fiber permalloy sleeve;

DETAILED DESCRIPTION

Figure 3:
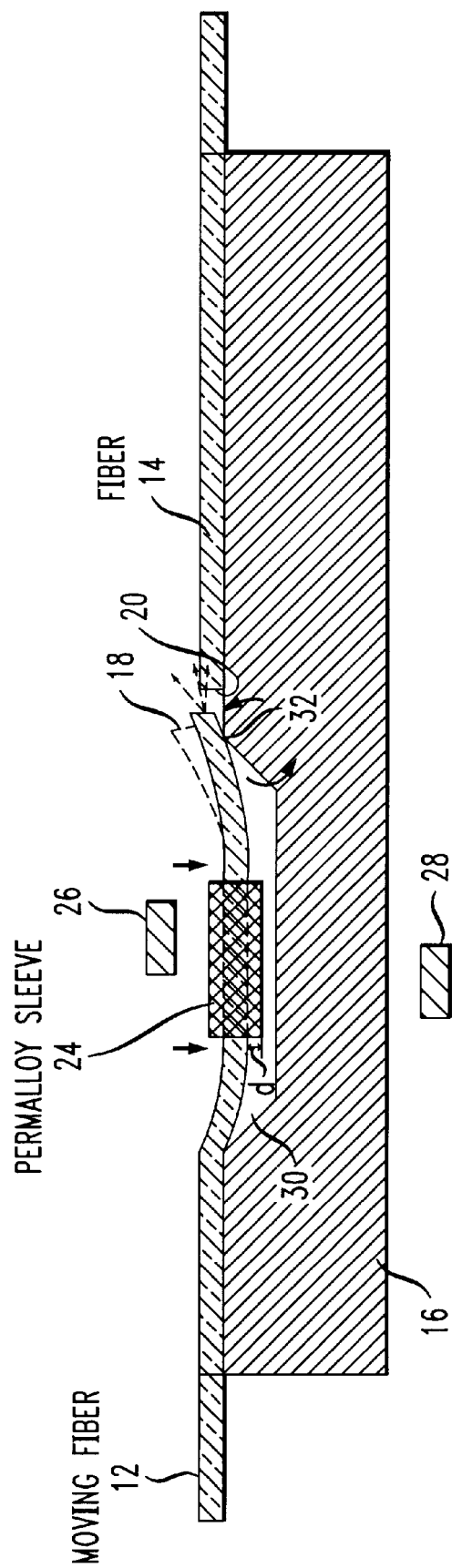
FIG. 3 is a cut-away side view of the arrangement of FIG. 1, with the application of a magnetic field, illustrating in particular the resultant misalignment between the movable fiber endface and the fixed fiber endface.

FIG. 1 contains a side view of an exemplary variable attenuator 10 formed in accordance with the present invention. Variable attenuator 10 comprises a first, movable fiber 12 and a second, fixed fiber 14, where fibers 12 and 14 are disposed in an end-to-end configuration on a common substrate 16. In particular, a first endface 18 of movable fiber 12 is disposed coaxially with a first endface 20 of fixed fiber 14 such that in the position as illustrated in FIG. 1 essentially all of the light output from movable fiber 12 is coupled into fixed fiber 14 (i.e., approximately 100% power coupling, no attenuation). Alignment between endfaces 18 and 20 can be achieved by utilizing a common V-groove 22 to support both fibers. FIG. 2 contains a top view of attenuator 10, clearly illustrating V-groove 22 and the positioning of fibers 12 and 14 within groove 22.

In accordance with the present invention, variable attenuation in the optical signal passing between fibers 12 and 14 is accomplished by displacing endface 18 of movable fiber 12 with respect to endface 20 of fixed fiber 14. Displacement is achieved by using an external force, such as a magnetic field, to physically adjust the position of movable fiber 12 relative to fixed fiber 14. Referring to FIG. 1, movable fiber 12 in this embodiment is illustrated as including a permalloy sleeve 24 disposed to surround a portion of movable fiber 12 proximate to endface 18. A pair of permalloy members 26 and 28 are illustrated in FIG. 1 as disposed above and below permalloy sleeve 24. Also included in this particular embodiment of the present invention is an external coil 27 (shown in FIG. 2), which is disposed to surround substrate 16 in the vicinity of members 26 and 28. An external current source (not shown) is coupled to coil 27 and used to induce a magnetic field in attenuator 10. In the configuration as illustrated in FIG. 1, there is no applied current and thus no magnetic field. Therefore, permalloy sleeve 24 will remain motionless such that endface 18 is coaxial with endface 20 and full optical signal coupling is achieved.

Upon the application of an electrical current to coil 27, a magnetic field will be created so as to draw permalloy sleeve 24 downward into cavity 30 formed in substrate 16 (see also FIG. 2). FIG. 3 illustrates attenuator 10 upon the application of a magnetic field, with permalloy sleeve 24 displaced by an amount d. in this embodiment of the present invention, edge 32 of cavity 30 functions as a fulcrum, causing a controlled, upward movement of endface 18 of fiber 12 out of coaxial alignment with endface 20 of fixed fiber 14. Therefore, a portion of the optical signal exiting movable fiber 12 will be lost and not coupled into fixed fiber 14, attenuating the power of the optical signal propagating through fixed fiber 14. Advantageously, variable attenuation is achieved by adjusting the applied current, which in turn adjusts the strength of the applied magnetic field, where as the field is increased permalloy sleeve 24 will be drawn further down into cavity 30 such that endface 18 is further displaced with respect to endface 20. Shown in phantom in FIG. 3 is a second, lower position of permalloy 24, where this position results in endface 18 of movable fiber 12 moving further upward—further attenuating the strength of the optical signal coupled into fixed fiber 14. Obviously, as the magnetic field is decreased, permalloy sleeve 24 will move upward, bringing endface 18 closer into alignment with endface 20. Continuous variability of the degree of attenuation can thus be achieved, as controlled by continued adjustments of the applied magnetic field.

Figure 4:
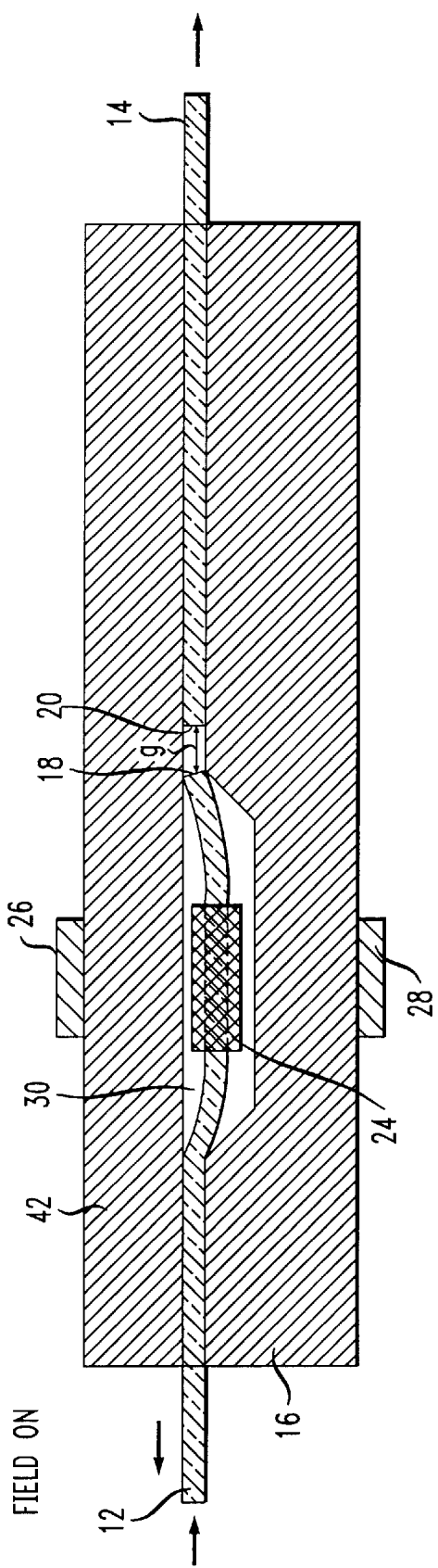
FIG. 4 is a side view of an alternative of the present invention, including a lid for constraining the upward displacement of the movable fiber endface.
Figure 5:
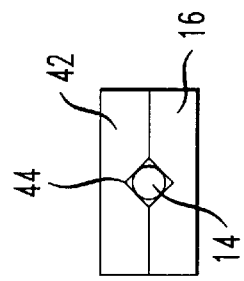
FIG. 5 is an end view of the arrangement of FIG. 4.

An alternative arrangement of the present invention is shown, in a side view, in FIG. 4. In this example, a variable attenuator 40 of the present invention includes a lid member 42 disposed to encapsulate both movable fiber 12 and fixed fiber 14. In one embodiment, lid member 42 may include a V-groove 44 that aligns with V-groove 22 of substrate 18, as shown in the end view of FIG. 5, allowing for proper placement of fibers 12 and 14. Upon the application of an external magnetic field to attenuator 40, upward movement of endface 18 of movable fiber 12 will be prevented by the presence of lid 42. Endface 18, as shown, will thus be forced backward along V-groove 22, creating a gap g between endface 18 and endface 20 and attenuating the optical signal passed therebetween. As with the arrangement described above, the adjustment of the externally applied magnetic field will adjust the relative position of permalloy sleeve 24 with respect to cavity 30, resulting in modifying the separation g between endfaces 18 and 20 (and therefore varying the attenuation of the optical signal passing between fibers 12 and 14).

It is to be understood that the above-described arrangements are merely illustrative of the many possible specific embodiments which can be devised to represent application of the principles of the present invention. Numerous and varied other arrangements can be devised in accordance with these principles by those skilled in the art without departing from the spirit and scope of the invention. In particular, while the magnetic control arrangement described above is preferred, other designs for physically moving the first fiber relative to the second fiber are possible (such as with a vacuum, for example), and all are considered to fall within the spirit and scope of the present invention.

What is claimed is:

1. A variable fiber optic attenuator comprising a first, movable fiber including a first endface;

a second, fixed fiber including a first enface;

a fixed substrate for supporting said first and second fibers such that the first endfaces of each fiber are disposed so as to provide optical coupling therebetween, said substrate defined as having a top surface and further comprising a cavity disposed underneath an end portion of said first, moveable fiber proximate to said first endface of said first, moveable fiber; and an adjustable arrangement for physically moving said end portion of said first fiber into said cavity of said fixed substrate and introducing attenuation in an optical signal by decreasing the optical coupling between said first endface of said first, moveable fiber and said first endface of said second, fixed fiber, said adjustable arrangement comprising a permalloy sleeve disposed to surround the end portion of the first, moveable fiber;

electromagnetic plates disposed above and below said sleeve; and an electromagnetic source for varying the magnetic field applied to said plates wherein in the presence of a magnetic field said permalloy sleeve is drawn into the substrate cavity and said first fiber endface moves upward relative to the endface of the second, fixed optical fiber in the presence of the magnetic field to achieve optical attenuation.

2. A variable fiber optic attenuator as defined in claim 1 wherein the attenuator further comprises a lid member disposed to encapsulate the first and second fibers so as to constrain movement of said first fiber endface in a manner to increase the axial separation between the endfaces.

3. A variable fiber optic attenuator as defined in claim 1 wherein the substrate comprises silicon.

4. A variable fiber optic attenuator as defined in claim 1 wherein the substrate comprises a V-groove formed in the top surface, said V-groove for supporting the first and second optical fibers.

* * * * *